Figure 1:
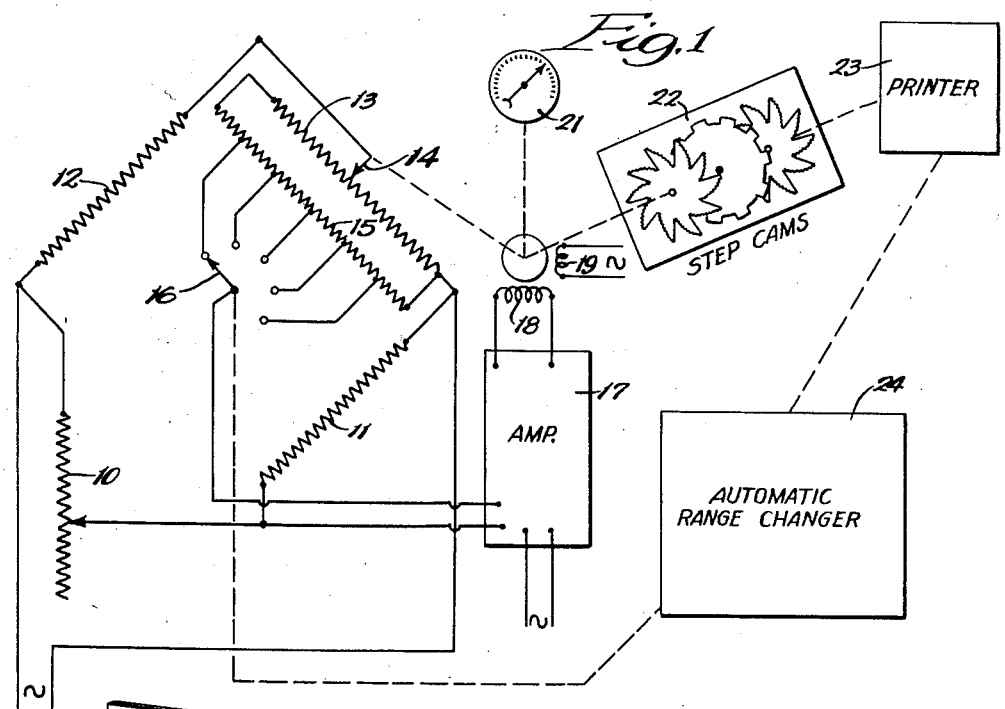

Nov. 5, 1957  V. C. KENNEDY, JR  2,812,170
WEIGHING APPARATUS
Filed Jan. 24, 1952  3 Sheets-Sheet 1

INVENTOR:
Verne C. Kennedy Jr.,
BY
E. S. Borth
ATTORNEY.

Nov. 5, 1957  V. C. KENNEDY, JR  2,812,170
WEIGHING APPARATUS
Filed Jan. 24, 1952  3 Sheets-Sheet 3

INVENTOR:
Verne C. Kennedy Jr.,
BY
E. A. Borth,
ATTORNEY.

United States Patent Office 2,812,170
Patented Nov. 5, 1957

2,812,170

WEIGHING APPARATUS

Verne C. Kennedy, Jr., Chicago, Ill., assignor to Streeter-Amet Company, Chicago, Ill., a corporation of Illinois Application January 24, 1952, Serial No. 268,040

15 Claims. (Cl. 265—5)

This invention relates to weighing apparatus and more particularly to an apparatus for weighing a load and making a printed record of the weight.

Mechanically operated recording scales which print the weight of a load have been used successfully and extensively for many years. Scales of this type are illustrated, for example, in the patents to Brendel, Nos. 2,040,073 and 2,366,432, and to Basquin, No. 2,131,683. In recent years there has been a trend towards electric weighing by the use of electric load cells which produce an electric indication of the weight of the load. It is desirable in such scales that electrical means be provided to change the range of operation so that a compact mechanism can be provided which is capable of the desired accuracy over a wide range of values. In such scales, it is desirable to prevent operation of the printing or other recording mechanism when the weight of the load is outside of the range for which the apparatus is set.

It is, accordingly, one of the objects of the present invention to provide a weighing apparatus in which the printing mechanism is controlled electrically and electrical means are provided to prevent operation thereof when the apparatus is adjusted to a value outside of the range for which it is set.

According to one feature of the invention, the apparatus includes rotatable step cams and switches controlled by the position of the step cams to prevent operation of the printing mechanism when the step cams are adjusted to a value outside of the range. In the preferred construction, the step cam switches are operated when the step cams are near the limits of the range and additional switches are provided operated by the feeler fingers for the highest order step cam and functioning in co-operation with the step cam switches to prevent operation of the printing mechanism when the step cams are set to a position just above or just below the range.

Another object is to provide a weighing apparatus in which the printing mechanism may be set for a new range and the electrical weight sensing elements are simultaneously adjusted to respond to weights within the new range.

According to one feature an extra high order indicating or printing wheel is provided which can be turned to a position corresponding to the desired range and the electrical sensing circuit is adjusted simultaneously to move the step cams to positions within the same range.

Still another object is to provide weighing apparatus in which electrical circuits are energized when the step cams are outside of the adjusted range to operate signals and which can also be utilized to adjust the mechanism automatically to change the range thereof.

A further object is to provide a weighing apparatus in which the step cam of a higher order is set in accordance with the position of a lower order step cam to insure positioning of the higher order step cam such that the feeler finger therefor will engage the proper step.

In the preferred construction, a compensating cam turns with the low order step cam and provides two radially spaced cam surfaces corresponding to different parts of a complete series of low order digits and which are engaged by a compensating finger whose movement adjusts the position of the higher order cam.

A still further object is to provide a weighing apparatus in which the printing mechanism is set by racks adjustably carried by the feeler fingers and which can be adjusted on the feeler fingers to insure proper registry of the digits on the printing mechanism at the printing position.

Figure 2:
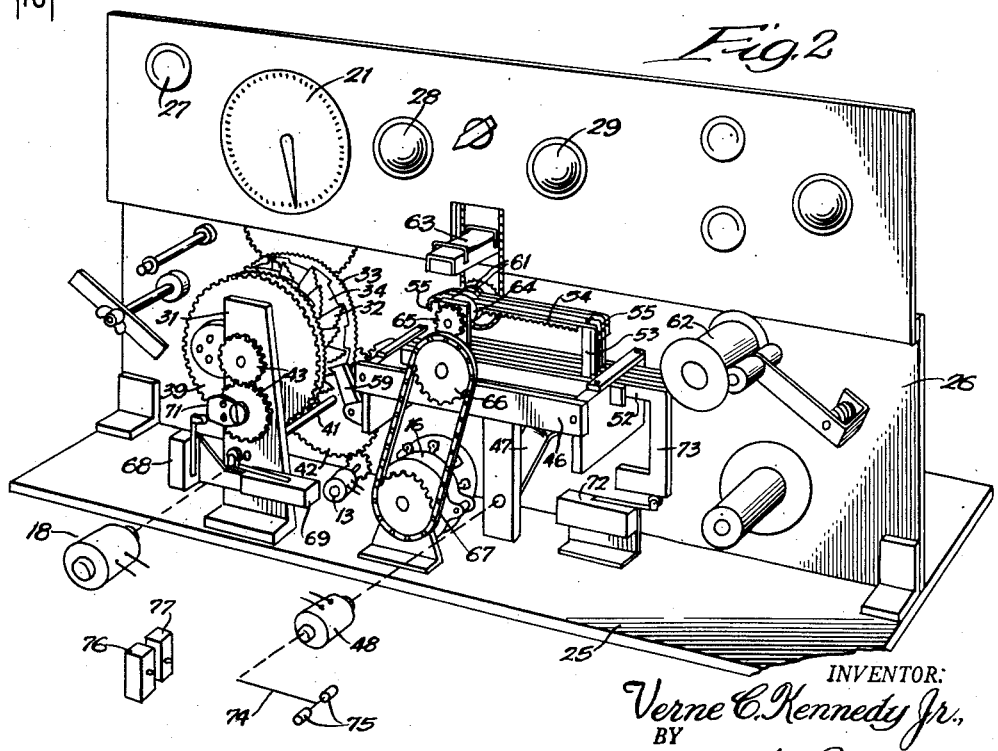
Figure 3:
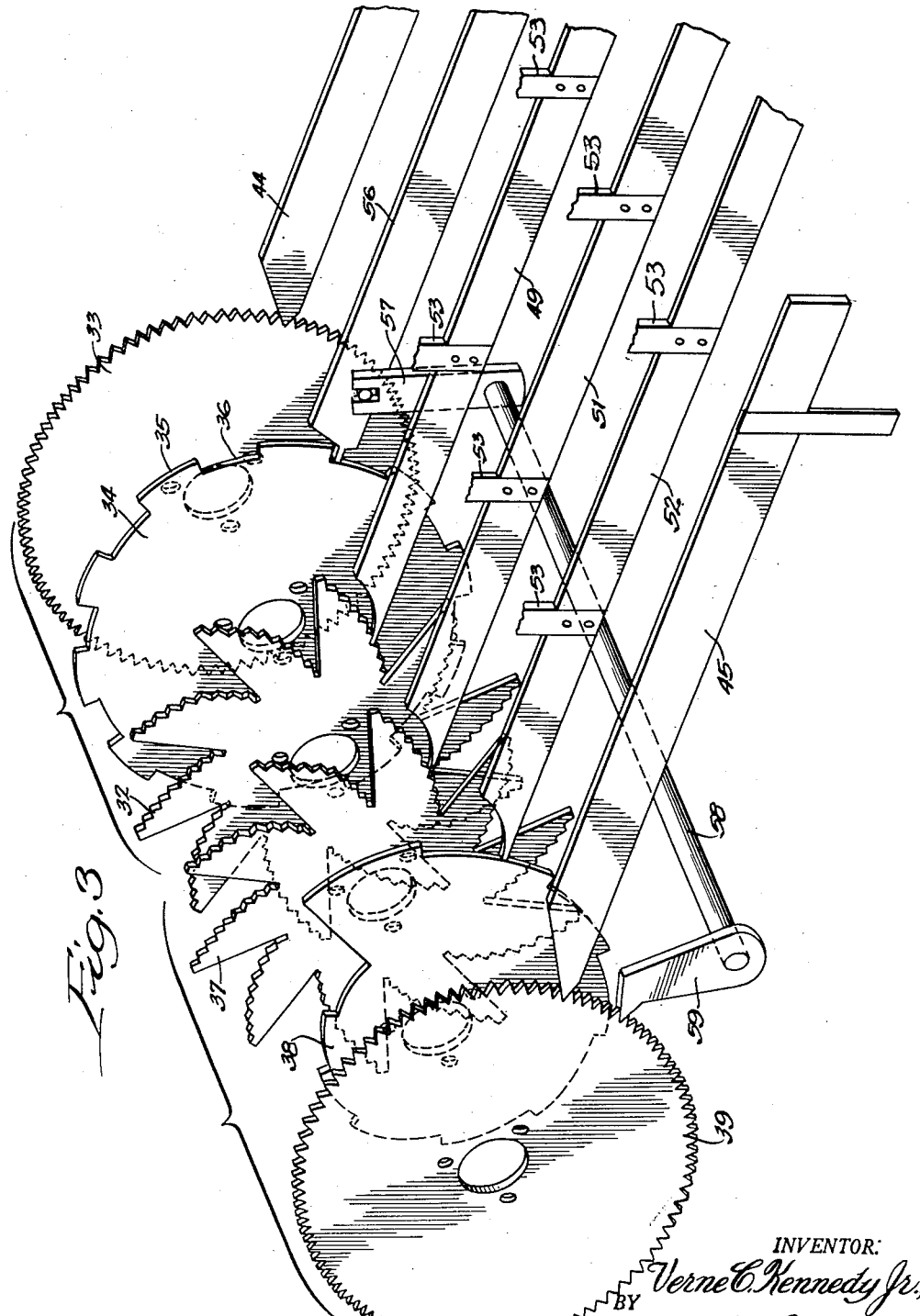
Figure 4:
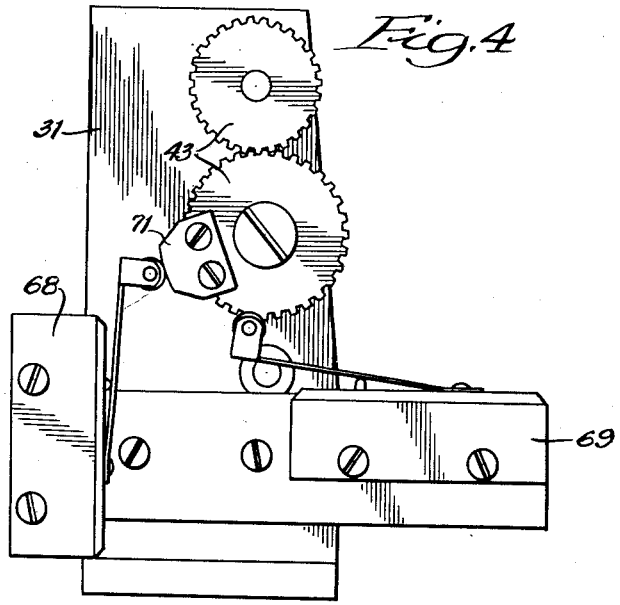
Figure 5:
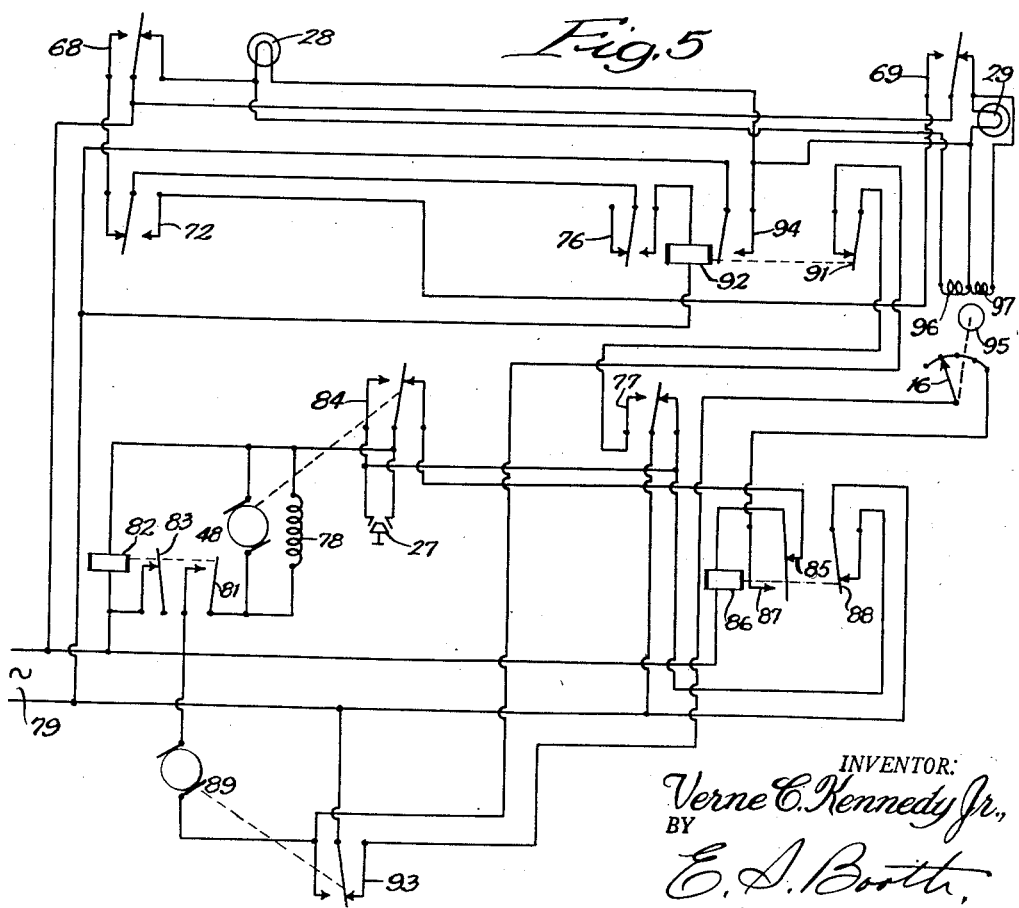

The above and other objects and features of the invention will be more readily apparent from the following description when read in connection with accompanying drawings in which Figure 1 is a diagrammatic view of a complete weighing apparatus embodying the invention, Figure 2 is a perspective view of the step cam and printing mechanism. Figure 3 is a partial perspective view of the step cam and compensating mechanism. Figure 4 is an enlarged partial elevation of the step cam switch construction and Figure 5 is a wiring diagram.

The complete apparatus, as illustrated diagrammatically in Figure 1 is adapted to sense the weight of a load electrically and to set the printing mechanism so that it will correctly indicate the weight. The apparatus may include one or more load cells which produce a change in resistance in response to the weight of a load and which are indicated diagrammatically at 10 as a variable resistance device. The variable resistance 10 is connected in a bridge circuit with a pair of fixed resistors 11 and 12 and a variable resistor 13 having a wiper 14 movable thereover to change its effective value. For the purpose of adjusting the range of operation, the resistor 13 has connected in parallel therewith a tapped resistor 15, the taps on which lead to different contacts on a selector switch which includes a wiper 16 movable over the contacts.

The wiper 16 and the variable resistor 10 are connected to the input terminals of an amplifier 17 whose output is connected to the control winding 18 of a reversible two-phase motor. The amplifier 17 is phase sensitive so that as the bridge is unbalanced in one direction or the other, the phase of the current in the winding 18 will either lead or lag the current in a main motor winding 19 so that the motor will turn in one direction or the other. The motor is connected to the wiper 14 to move it over the resistor 13 in a direction to rebalance bridge circuit and when the bridge circuit is in balance no voltage will be impressed on the amplifier input terminals and the system will be in balance. It will be seen, therefore, that the motor 18 will, at all times, turn to a position which is proportional to the value of the load on the load cells 10.

In addition to moving the wiper 14, the motor 18 may operate an indicator 21 and also drives a series of step cams illustrated diagrammatically at 22. The step cams set a printer 23 which can be operated to produce a printed record of the weight on the load cells. When the printing mechanism is set beyond the range for which the switch 16 is adjusted, it will energize an automatic range changer 24 which will signal to the operator that the mechanism is out of range and which may also automatically adjust the switch 16 to bring the range of the mechanism to the proper value to weighing the load.

As shown in Figure 2, the apparatus may be mounted on a base 25 having a vertical panel 26 projecting therefrom on which the indicator 21 is mounted and which may also carry a starting switch button 27 and signal lights 28 and 29 to indicate when the apparatus is out of range. The step cams are supported on the base at one side of the vertical frame 26 between the frame 26 and an upright 31 spaced therefrom. As best seen in Figure 3, the step cam assembly comprises a low order or units step cam 32 which may be divided into a plurality of complete series of units. As shown, the step cam 32 has ten lobes each of which is divided into ten steps and each of which encompasses a series of units from one through ten. It is therefore necessary for this cam to turn only through one-tenth of a revolution for each ten digits or for each ten units in the load although it will be apparent that the cam could be arranged to turn a complete revolution for each ten units or could have more or less lobes than ten to turn through a different fraction of a revolution for each ten units. The cam 32 is rigidly connected to turn with a correlator wheel 33 which is formed on its periphery with V-shaped teeth corresponding in number and spacing to the individual steps on the step cam 32. A compensator cam 34 also turns with the step cam 32 and the correlator disc 33. This cam, as shown, is provided with a series of lobes each of which terminates in an arcuate outer surface 35 and which are spaced by arcuate surfaces 36 equal in angular length to the lobes 35. One pair of surfaces 35 and 36 corresponds to each complete lobe on the cam 32 so that there are ten lobes on the compensating cam and ten radially inner surfaces 36. The surfaces 35 as shown, register with the outer half of each complete lobe on the cam 32 corresponding to the numbers from zero to four of each series while the surfaces 36 register with the inner half of each lobe on the cam 32 corresponding to the numbers from five to nine.

In the construction shown the tens and hundreds cams are driven together, the tens cam 37 being similar to the units cam 32 and the hundreds cam 38 having ten steps thereon each of which corresponds to a complete lobe on the cam 37. The cams 37 and 38 are connected to turn with a correlator wheel 39 similar to the wheel 33 and which has a series of V-shaped teeth therein corresponding in number and space to the individual steps on the tens cam 37.

The step cams are driven by the motor 18 through a counter shaft 41 which connects them together so that the tens and hundreds cams will be driven at one-tenth the speed of the units cam. As shown, the shaft 41 carries a gear 42 which meshes with a gear on the units cam shaft and also drives through gears 43 to turn the tens and hundreds cam shaft at a lower speed. Preferably, all of the cams are connected to their shafts through resilient driving means as more fully described in the patent to Brendel, No. 2,040,073, so that they can be turned slightly relative to their shafts but will normally turn with the shafts.

The correlator discs 33 and 39 are adapted to be engaged by pointed correlator fingers 44 and 45 respectively to turn the step cams to a position such that the feeler fingers therefore will accurately engage steps thereon and will not accidentally slip over a shoulder. The fingers 44 and 45 are slidably mounted on a frame 46 carried by the base 25 for lineal sliding movement towards and away from the correlator discs. Springs not shown urge the correlator fingers towards the discs and they are moved away from the discs by a pivoted arm 47 which engages projections therein to shift the fingers to the retracted positions shown. The arm 47 is driven by a finger motor 48 which will, in a complete cycle of operation, move the arm 47 away from the fingers so that they can move towards the correlator discs and then return them to their inactive position as shown.

The frame 46 carries feeler fingers for the respective step cams which are moved into engagement with the step cams to set the printing mechanism. As shown in Figure 3 a feeler finger 49 moves into engagement with the units step cam 32, a similar feeler finger 51 moves into engagement with the tens step cam 37 and a feeler finger 52 moves into engagement with the hundreds step cam 38. The feeler fingers 49, 51 and 52 are urged towards the step cams by springs and are moved away from the step cams by the arm 47 and the finger motor.

Each of the feeler fingers 49, 51 and 52 carries on its upper surface a pair of upwardly projecting arms 53 spaced longitudinally of the fingers. Elongated racks 54 are mounted for longitudinal sliding movement on the arms and are formed at their ends with downwardly bent extensions 55 which overlie the outer surfaces of the projections 53. The extensions 55 carry adjusting screws which abut the outer surfaces of the arms 53 by means of which the racks can be adjusted on the feeler fingers to insure proper registry of the printing mechanism.

With the construction as described, it will be seen that when the units cam approaches the ends of a unit series, the correlator fingers 45 might engage the wrong side of a tooth on the high order correlator disc 39 so that a false indication would be obtained. The compensator cam 34 is provided to prevent this condition and to insure that under all conditions the high order step cams will be properly set. For this purpose a compensator finger 56 is movable into engagement with the compensator cam 34. The compensator finger carries a pin which sets in a slot in an arm 57 carried by a compensator shaft 58. The shaft 58 also carries a pawl 59 which is engageable with the high order correlator disc 39 to turn it.

When the units cam is in the low end of a series one of the outer surfaces 35 will be presented to the compensator finger 56 so that its inward movement will be limited. At this time the shaft 58 is turned to a very slight extent only not sufficient to engage the pawl 59 with the correlator disc 39. When the units cam is adjusted to the upper half of a series of digits as shown in Figure 3, the correlator disc 39 for the high order cams will be turned to a position such that the finger 45 might engage the wrong tooth thereby giving a false indication. Under these conditions, the radially inner surface 36 of the compensator cam 34 will register with the compensator finger 56 so that it can move inward to a greater extent as indicated in Figure 3. At this time the shaft 58 will be turned farther to bring the pawl 59 into engagement with the high order correlator disc 39 to turn this disc and the high order step cams backward approximately one-half tooth so that the finger 45 will necessarily engage the proper tooth for a correct indication.

In operation of the appartus the fingers are controlled so that the finger 44 will first move into engagement with its correlator disc 33 to lock the units step cam at the proper position. Thereafter the compensator finger 56 will move into engagement with the cam 34 and will, if required, turn the high order disc 39. Immediately after this operation the correlator finger 45 will move into the disc 39 and lock the high order cams in the proper position. Following this the feeler fingers 49, 51 and 52 will move into engagement with the respective step cams to set the printing mechanism.

The printing mechanism as shown, comprises three numbered discs 61 corresponding to the units tens and hundreds digits in the weight. The discs 61 carry pinions which mesh with the racks 54 of the respective feeler fingers so that when the feeler fingers move into engagement with the step cams the discs will be set to the proper digital values corresponding to the weight on the apparatus. A reel 62 may be provided to carry a recording tape over the discs 61 or if desired, can be omitted where the weight is to be printed on cards.

The printing mechanism is completed by an anvil 63 mounted for movement towards and away from the printing wheels 61 and which preferably carries an inked ribbon to produce a printed record of the weight corresponding to the position of the discs 61. The anvil 63 is normally held in an elevated position as shown in Figure 2 and is adapted to be moved towards the printing discs by an electric motor which may be a solenoid or a single revolution motor driving the anvil through a cam.

The printing mechanism also includes an additional high order disc 64 which in the mechanism shown would be a thousands disc. The disc 64 is adapted to be set through a pinion 65 meshing with a pinion which is turned with a sprocket wheel 66 to change the range of the apparatus. The sprocket wheel 66 is connected through a sprocket 67 with a sprocket wheel on the range change switch 16. Through this mechanism when the printing wheel 64 is adjusted for example, to print in the range from 2,000 to 3,000 the switch 16 will be adjusted simultaneously to set the bridge circuit for weights within the same range. The range change can be effected manually or can be controlled automatically as described hereinafter.

With a mechanism of the type here involved, it is desirable to prevent operation of the printing device if the load being weighed is outside of the range to which the mechanism is adjusted. For this purpose a pair of switches 68 and 69 are provided adjacent to the step cam mechanism to be controlled in accordance with the position of the step cams as they approach the limits of their range of movement. One of the pinions 43 carries a cam member 71 which engages operating arms on the switches 68 and 69 to actuate the switches in accordance with the position of the step cams. As shown in Figure 5, the switches 68 and 69 are double throw switches which normally occupy the position illustrated and which are moved through the cam 71. The switch 68 is so positioned that it will be moved by the cam 71 when the step cams are near the zero end of a range as for example, when the step cams are set to a value less than 100. The switch 69 will be actuated by the cam 71 when the step cams are near the upper limits of their range as for example, the values in excess of 100.

An additional double throw switch 72 is mounted on the base 25 and is adapted to be actuated by an extension 73 on the high order feeler finger 52. The switch 72 normally occupies the position shown in Figure 5. When the extension 73 engages the operating arm of the switch 72 as shown in Figure 2, it will move the switch 72 to its opposite position. It will be noted that when the hundreds step cam is in the lower portion of its range, that is from zero to 400, the finger 52 will not move in sufficiently far to disengage the extension 73 from the switch 72. However, when the hundreds cam is in the upper portion of its range from 500 to 900, the finger 73 will disengage the switch 72 and allow it to move to the illustrated position.

The finger motor 48 is adapted to be stopped after completing one-half revolution at a time when the feeler fingers are in engagement with the step cams. For this purpose the motor 48 carries an arm 74 having a pair of rollers 75 thereon to engage and operate switches 76 and 77. The switch 76 as shown in Figure 5, is a single pole switch which is normally open and which is closed when one of the rollers 75 engages it. The switch 77 is a double throw switch which normally occupies the position shown in Figure 5 and which is moved to its opposite position when it is engaged by one of the rollers 75.

The control circuit as shown in Figure 5 includes the several motors and switches as heretofore described. The finger motor 48 as illustrated has a brake solenoid winding 78 which is energized simultaneously with the motor to disengage a brake thereon. When the motor is de-energized, the brake is engaged by a spring to hold the motor stationary. The motor 48 and the brake winding 78 are adapted to be connected to a source of power indicated at 79 through a normally open switch 81 which is closed when a relay winding 82 is energized. The winding 82 may also open a normally closed switch 83 which is connected in circuit with the adjusting motor 18 so that this motor can not be operated to turn the step cams during a printing operation. The relay 82 is connected through the starting switch 27 and through the normally closed contact on the switch 77 into the circuit. Thus when the starting switch is closed, the relay 82 will be energized to interrupt the adjusting motor 18 and to start the finger motor 48. The finger motor carries a cam which operates a holding switch 84 to complete a holding circuit parallel to the starting switch 27. The holding switch is a double throw switch whose normally closed contact is connected through a normally closed contact 85 of a relay switch with a relay winding 86. Thus when the starting switch 27 is closed, the relay 86 will also be energized through its normally closed contact 85. When the relay 86 is energized it closes a circuit with a contact 87 constituting a holding switch for the relay and thereafter breaks the contact 85. At the same time, the relay opens a normally closed switch 88 in a restarting circuit for the finger motor. The relay contact 87 is connected in circuit through the range change switch 16 so that whenever the range change switch is moved, the relay circuit will be interrupted and the contacts will return to the position illustrated.

The printing mechanism is actuated by a motor shown at 89 which, as explained above, may be either a rotary motor operating the printing anvil through a cam or may be a solenoid which, when energized, will move the anvil downward to effect a printing operation. The printing motor 89 is connected in circuit through a normally closed switch 91 which is opened by a relay 92 when it is energized. When the printing motor is energized, it operates a double throw holding switch 93 which normally occupies the position shown and which is moved during initial operation of the printing mechanism to complete a holding circuit through the printing motor. In this way, the printing motor is insured of completing a printing operation each time it is energized and at the end of the printing operation it will release the switch 93 which then returns to the illustrated position.

The relay 92 is connected in circuit with the switch 76 which is, in turn, in circuit with the switch 72 as shown. The switch 72 has its contacts connected to the normally opened contacts of the switches 68 and 69 so that the relay 92 will be energized only when the mechanism is out of range. In addition to opening the switch 91, the relay 92 closes a normally open switch 94 which is connected in circuit with the signal lights 28 and 29 to energize them. The signal lights are also connected as shown to the normally closed contacts of the switches 68 and 69.

When an automatic range change is desired, it can be effected through a reversible motor 95 having reversing windings 96 and 97 connected in parallel with the signal lights 28 and 29 respectively. Thus when either of the signal lights is energized indicating that the apparatus is out of range, the motor 95 will be energized to turn the switch 16 in a direction to reset the range either up or down in accordance whether the apparatus is below or above range. In operation of the apparatus, when a weight is placed on the load cells 10 it will cause an unbalance of the bridge circuit which will effect operation of the motor 18 to a position to rebalance the bridge. The motor 18 will drive the step cams to a position corresponding to the load and will, at the same time, move the indicator 21 to indicate the load.

When a printed record of the load is desired, the starting switch 27 is temporarily closed. This will energize the relay 82 to close the switch 81 and start the finger motor 48. At the same time the relay 86 will be energized after which it will open the contact 85 and close the contact 87. Under this condition the relay 86 remains energized through its holding contact 87, the range switch 16 and the normally closed contact of the switch 93.

As soon as the finger motor starts, it closes the holding switch 84 which will hold the relay 82 energized and will maintain the finger motor in operation. When the finger motor has completed one-half of its cycle so that the feeler fingers are in engagement with the step cams, one of the rollers 75 on the finger motor will throw the switch 77 to its left hand position as illustrated in Figure 5. This completes a circuit through the printing motor 89 including the normally closed switch 91 and the left hand contact of the switch 77. When the printing motor is energized, it throws the switch 93 to complete the holding circuit for the printing motor and at the same time to interrupt the holding circuit for the relay 86. At this time, the relay 86 is de-energized so that the switch 88 again closes. The switch 88 completes a circuit through the relay 82 to restart the finger motor, it being noted that the holding switch 84 remains actuated by the finger motor regardless of the stopping thereof. This circuit can be traced through the relay 82, the holding switch 84 and the switch 88. The finger motor will therefore restart and during the remaining half of its cycle will retract the feeler fingers from the step cam mechanism. Upon completion of this operation, the holding switch 84 will be released to return to its normal position as shown in Figure 5 and de-energize the relay 82. At this time the switch 81 will open to stop the finger motor and release the brake so that it can be applied by its spring. If the apparatus is out of range, the printing operation as just described, will be prevented and the signals and range change motor 95 will be energized. Assuming that the range is set for 1,000 to 2,000 and the load actually on the load cells is less than 1,000. Under these conditions, the switch 68 will be shifted to the left and the high order feeler finger 52 will move completely in to the nine hundreds step on the hundreds step cam so that it releases the switch 72. The switch 72 will therefore be in the position shown in Figure 5. When the feeler finger motor has completed half of its cycle, it will close the switch 76 at approximately the same time that it operates the switch 77 or preferably slightly in advance of operation of the switch 77. With the parts in this position, the relay 92 will be energized to open the switch 91 so that the printing motor cannot be energized.

At the same time the relay 92 will close the switch 94 to complete a circuit through the normally closed contact of the switch 69 and the signal 29. This will indicate to the operator that the weight is less than the range for which the apparatus is set and that the range should be reduced. At the same time, the winding 97 of the motor 95 will be energized to turn the motor 95 and the switch 16 in a direction to reduce the range. As soon as the switch 16 is moved, it will interrupt the holding circuit through the relay 86 which will then be de-energized to close the switch 88 and restart the finger motor. With the apparatus now properly adjusted so that the weight falls within its range, the starting switch 27 may again be closed to initiate the printing cycle which will then be completed as outlined above.

When the weight is greater than the range setting of the apparatus, the operation will be reversed in that the switch 69 will be thrown to the left and the high order feeler finger 52 will engage the zero step on the hundreds cam. At this time, the extension 73 will engage the switch 72 to move it to the right as seen in Figure 5. A circuit will therefore be completed through the relay 92 through the right hand contact of the switch 72 and the normally open contact of the witch 69. This will energize the signal 28 through the switch 94 and at the same time will energize the winding 96 of the reversible motor 95 to drive the switch 19 in an up range direction.

It will be noted that with this type of control the apparatus will operate throughout the full range and will be prevented from operating when the weight is a single unit above or below the range. Near the bottom of the range for example, the switch 68 will be thrown to the left during approximately the last hundred units of operation. However, at the same time, the hundreds cam is in a position such that its zero step is engaged by the feeler finger 52 and the switch 72 will remain thrown to the right so that the relay 92 will not be energized. As soon as the hundreds cam is turned beyond the zero step so that the feeler finger 52 moves into the 900 step, the switch 72 will be released to move to its left hand position as shown in Figure 5 so that the relay 92 will be energized. Similarly near the top of the range, the switch 69 will be actuated but since the feeler finger 52 is normally moving into the 900 step, the switch 72 will be in the position shown in Figure 5. When, however, the hundreds step cam is turned one unit past the top of the range so that the feeler finger 52 engages the zero step therein, the switch 72 will be held in its right hand position by the extension 73 and the relay 92 will be energized. The apparatus is thus capable of sensing an over or under range weight of a single unit so that under no conditions will an incorrect weight ever be printed.

While one embodiment of the invention has been shown and described in detail, it will be understood that this is illustrative only and is not to be taken as a definition of the scope of the invention, reference being had to this purpose to the appended claims.

What is claimed is:

1. Weighing apparatus comprising a motor, means responsive to a load to cause the motor to move to a position corresponding to the weight of the load, electrically operated printing mechanism, means operated by the motor to set the printing mechanism to a value corresponding to the weight of the load, an operating circuit for the printing mechanism, a switch in the operating circuit, means operated by the last named means to open the switch thereby to prevent operation of the printing mechanism when the last named means tends to set the printing mechanism to a value outside of its printing range, an adjusting device to change the range of the printing mechanism, and adjusting means for the first named means to change the range of response of the first named means to a load and connected to the adjusting device to be adjusted simultaneously therewith.

2. Weighing apparatus comprising a motor means responsive to a load to cause the motor to move to a position corresponding to the weight of the load, electrically operated printing mechanism, setting means for the printing mechanism connected to the motor to be operated thereby, operating mechanism controlled by the setting means to set the printing mechanism, an operating circuit for the printing mechanism to cause it to print, a first switch in the operating circuit closed by the operating mechanism at the end of a setting operation normally to energize the operating circuit, a second normally closed switch in the operating circuit, a relay to open the second switch when energized, a pair of energizing circuits for the relay including respectively switches operated by the setting means as it approaches the upper and lower limits of its range of movement, and a second pair of switches in the energizing circuits respectively operated by the operating mechanism when the setting means is just above or just below its range of movement.

3. Weighing apparatus comprising a motor, means responsive to a load to cause the motor to move to a position corresponding to the weight of the load, electrically operated printing mechanism setting means for the printing mechanism connected to the motor to be operated thereby, operating mechanism controlled by the setting means to set the printing mechanism, an operating circuit for the printing mechanism to cause it to print, a first switch in the operating circuit closed by the operating mechanism at the end of a setting operation normally to energize the operating circuit, a normally closed switch in the operating circuit, a relay to open the normally closed switch when energized, a pair of parallel energizing circuits for the relay, a pair of switches in series in each energizing circuit, means operated by setting means to close one of the switches in one operating circuit when the setting means approaches the lower limit of its range of movement and to close one of the switches in the other operating circuit when the setting means approaches the upper limit of its range of movement, and means operated by the operating mechanism to close the other switch in said one circuit when the setting means is just below the lower limit of its range of movement and to close the other switch in said other circuit when the setting means is just above the upper limit of its range of movement.

4. Weighing apparatus comprising a motor, means responsive to a load to cause the motor to move to a position corresponding to the weight of the load, electrically operated printing mechanism setting means for the printing mechanism connected to the motor to be operated thereby, operating mechanism controlled by the setting means to set the printing mechanism, an operating circuit for the printing mechanism to cause it to print, a first switch in the operating circuit closed by the operating mechanism at the end of a setting operation normally to energize the operating circuit, a normally closed switch in the operating circuit, a relay to open the normally closed switch when energized, a pair of parallel energizing circuits for the relay, a pair of switches in series in each energizing circuit, means operated by setting means to close one of the switches in one operating circuit when the setting means approaches the lower limit of its range of movement and to close one of the switches in the other operating circuit when the setting means approaches the upper limit of its range of movement, means operated by the operating mechanism to close the other switch in said one circuit when the setting means is just below the lower limit of its range of movement and to close the other switch in said other circuit when the setting means is just above the upper limit of its range of movement, an adjusting device to change the range of the printing mechanism, and adjusting means for the first named means connected to the adjusting device to be adjusted simultaneously therewith.

5. Weighing apparatus comprising a series of step cams of different orders, means ersponsive to a weight to move the step cams to a position corresponding to the weight, a series of feeler fingers movable into engagement with the step cams respectively, printing mechanism including adjustable printing members connected to the feeler fingers to be set thereby, electrical operating means for the printing mechanism, an energizing circuit for the operating means, a normally closed switch in the energizing circuit, a relay to open the normally closed switch, and an energizing circuit for the relay including a plurality of switches in series operated respectively by movement of the step cams as they approach the maximum and minimum limits of a range and by the fingers as they move to positions corresponding to the maximum and minimum limits of a range.

6. Weighing apparatus comprising a series of step cams of different orders, means responsive to a weight to move the step cams to a position corresponding to the weight, a series of feeler fingers movable into engagement with the step cams respectively, printing mechanism including adjustable printing members connected to the feeler fingers to be set thereby, electrical operating means for the printing mechanism, an energizing circuit for the operating means, a normally closed switch in the energizing circuit, a relay to open the normally closed switch, a pair of energizing circuits for the relay, a pair of switches in series in each of the energizing circuits, means operated by the step cams to close one of the switches in the respective circuits as the step cams approach the limits of their range of movements in opposite directions, and means operated by the feeler finger for the highest order step cam to close the other switches in the circuits when the highest order step cam is just above or just below its range of movement.

7. Weighing apparatus comprising a series of step cams of different orders, means responsive to a weight to set the step cams to positions corresponding to the integers in the weight, a series of feeler fingers movable into engagement with the step cams respectively, printing mechanism connected to the fingers to be set thereby, means to operate the printing mechanism, and means to prevent operation of the printing mechanism when the step cams are set out of range including a pair of control devices operated by the step cams when they approach the limits of their range in either direction, and control devices operated by the feeler finger corresponding to the highest order step cam when the highest order step cam is just above or just below the limits of its range of movement, the control devices of the first and second pairs being connected respectively in series to the operating means to prevent operation thereof when both control devices of a series are operated.

8. Weighing apparatus comprising a series of step cams of different orders, means responsive to a weight to set the step cams to positions corresponding to the integers in the weight, a series of feeler fingers movable into engagement with the step cams respectively, printing mechanism connected to the fingers to be set thereby, means to operate the printing mechanism, and means to prevent operation of the printing mechanism when the step cams are set out of range including a pair of control devices operated by the step cams when they approach the limits of their range in either direction and a pair of control devices operated by the feeler finger for the highest order step cam, one of said last named control devices being operated when the highest order step cam is in its zero position and the other thereof being operated when the highest order step cam is in its nine position, the control devices of the first and second pairs being connected respectively in series to the operating means to prevent operation thereof when both control devices of a series are operated.

9. Weighing apparatus comprising a series of step cams of different orders, means responsive to a weight to set the step cams to positions corresponding to the integers in the weight, a series of feeler fingers movable into engagement with the step cams respectively, printing mechanism, connected to the fingers to be set thereby, means to operate the printing mechanism, and means to prevent operation of the printing mechanism when the step cams are set out of range including a pair of control devices operated by the step cams when they approach the limits of their range in either direction, and a pair of control devices operated by the feeler finger for the highest order step cam, one of the last named pair of control devices being operated when the highest order step cam is in its zero position and being in series with the first named control device which is operated when the step cams approach the upper limit of their range of movement and the other of the last named control devices being operated when the highest order step cam is in its nine position and being in series with the first named control device which is operated when the step cams approach the lower limit of their range of movement, simultaneous operation of two control devices which are in series preventing operation of the printing mechanism.

10. Weighing apparatus comprising a series of step cams, means responsive to a weight to move the step cams to a position corresponding to the value of the weight, a series of feeler fingers movable into engagement with the step cams respectively, a finger motor operable through a complete cycle to cause the feeler fingers to move into and then out of engagement with the step cams, printing mechanism connected to the feeler fingers to be set thereby, operating means for the printing mechanism, a starting switch for the finger motor, a switch operated by the finger motor at a point in its cycle when the feeler fingers engage the step cams to stop the finger motor and energize the operating means, a second switch operated by the finger motor at said point, switches operated by the step cams and feeler fingers and connected in circuit with the second switch and the operating means to disable the operating means when the step cams are in a position outside of their range, and a switch controlled by the operating means to restart the finger motor.

11. Weighing apparatus comprising a series of step cams, means responsive to a weight to move the step cams to a position corresponding to the value of the weight, a series of feeler fingers movable into engagement with the step cams respectively, a finger motor operable through a complete cycle to cause the feeler fingers to move into and then out of engagement with the step cams, printing mechanism connected to the feeler fingers to be set thereby, operating means for the printing mechanism, a starting switch for the finger motor, a switch operated by the finger motor at a point in its cycle when the feeler fingers engage the step cams to stop the finger motor and energize the operating means, a second switch operated by the finger motor at said point, switches operated by the step cams and feeler fingers and cooperating with the second switch to disable the operating means when the step cams are in a position outside of their range, means to adjust the range of the step cams, a switch controlled by the operating means to restart the finger motor, and means controlled by said adjusting means to restart the finger motor.

12. Weighing apparatus comprising a series of step cams, means responsive to a weight to move the step cams to a position corresponding to the value of the weight, a series of feeler finger movable into engagement with the step cams respectively, a finger motor operable through a complete cycle to cause the feeler fingers to move into and then out of engagement with the step cams, printing mechanism connected to the feeler fingers to be set thereby, operating means for the printing mechanism, a starting switch for the finger motor, a switch operated by the finger motor at a point in its cycle when the feeler fingers engage the step cams connected in circuit with the finger motor and the operating means to stop the finger motor and energize the operating means, a second switch operated by the finger motor at said point, switches operated by the step cams and feeler fingers and connected in circuit with the second switch and the operating means to disable the operating means when the step cams are in a position outside of their range, a relay energized by the starting switch, a normally closed switch opened by the relay when it is energized and connected to the finger motor to energize it independently of the starting switch, a switch controlled by the operating means when it is operated to de-energize the relay, means to adjust the range of the step cams, and a switch operated by the adjusting means to de-energize the relay.

13. Weighing apparatus comprising a plurality of relatively rotatable step cams of different orders, the lower order step cam including a plurality of sets of steps each corresponding to a complete series of digits, means to turn the step cams to a position corresponding to the value of a weight to be weighed, a plurality of feeler fingers movable into engagement with the step cams respectively, a compensating cam movable with the step cam of a lower order, a compensating finger movable into engagement with the compensating cam, the compensating cam having radially spaced cam surfaces corresponding to different portions of a complete series of digits in the lower order step cam and which are selectively engaged by the compensator finger in accordance with the position of the lower order step cam, and means operated by movement of the compensator finger into engagement with the compensator cam to turn the higher order step cam to a position such that the feeler finger for the higher order step cam will engage the correct step thereon.

14. Weighing apparatus comprising a plurality of relatively rotatable step cams of different orders, the lower order step cam including a plurality of sets of steps each corresponding to a complete series of digits, means to turn the step cams to a position corresponding to the value of a weight to be weighed, a plurality of feeler fingers movable into engagement with the step cams respectively, a compensating cam movable with the step cam of a lower order, a compensating finger movable into engagement with the compensating cam, a toothed correlator disc rotatable with each of the step cams and having tapered teeth thereon corresponding in number and spacing to the steps on the respective step cams, correlator fingers movable into engagement with the correlator discs to turn the discs and step cams to a position such that the feeler fingers will engage the central parts of the steps on the step cams, the compensating cam having radially spaced cam surfaces corresponding to different portions of a complete series of digits in the lower order step cam and which are selectively engaged by the compensator finger in accordance with the position of the lower order step cam, and means operated by the compensator finger as it moves into engagement with said cam surfaces to turn the higher order correlator disc and step cam to a position such that the higher order correlator finger will engage the proper tooth of the correlator disc.

15. Weighing apparatus comprising a plurality of relatively rotatable step cams of different orders, the lower order step cam including a plurality of sets of steps each corresponding to a complete series of digits, means to turn the step cams to a position corresponding to the value of a weight to be weighed, a plurality of feeler fingers movable into engagement with the step cams respectively, a compensating cam movable with the step cam of a lower order, a compensating finger movable into engagement with the compensating cam, the compensating cam having two radially spaced cam surfaces corresponding respectively to the lower and upper halves of a complete series of digits in the lower order step cam and which are selectively engaged by the compensating finger in accordance with the position of the lower order step cam, and means operated by movement of the compensating finger into engagement with one of said surfaces to turn the higher order step cam to a position such that the feeler finger therefor will engage the correct step thereon.

References Cited in the file of this patent

UNITED STATES PATENTS

| Number | Name | Date |
| --- | --- | --- |
| 1,757,072 | Boyer | May 6, 1930 |
| 2,040,073 | Brendel | May 12, 1936 |
| 2,067,741 | Weckerly | Jan. 12, 1937 |
| 2,070,011 | Hadley | Feb. 9, 1937 |
| 2,131,683 | Basquin | Sept. 27, 1938 |
| 2,163,183 | Baagoe | June 20, 1939 |
| 2,317,760 | Hahn | Apr. 27, 1943 |
| 2,370,805 | Leonard | Mar. 6, 1945 |
| 2,392,023 | Cooper | Jan. 1, 1946 |
| 2,424,118 | Rast | July 15, 1947 |
| 2,610,052 | Macgeorge | Sept. 9, 1952 |